(12) United States Patent
Foote

(10) Patent No.: US 7,492,921 B2
(45) Date of Patent: Feb. 17, 2009

(54) SYSTEM AND METHOD FOR DETECTING AND RANKING IMAGES IN ORDER OF USEFULNESS BASED ON VIGNETTE SCORE

(75) Inventor: Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 798 days.

(21) Appl. No.: 11/032,576

(22) Filed: Jan. 10, 2005

(65) Prior Publication Data

US 2006/0153456 A1 Jul. 13, 2006

(51) Int. Cl.
*G06K 9/00* (2006.01)
*G06K 9/62* (2006.01)

(52) U.S. Cl. ..................... 382/100; 382/224
(58) Field of Classification Search ............... 382/100, 382/132, 173, 224
See application file for complete search history.

(56) References Cited

U.S. PATENT DOCUMENTS 4,863,384 A * 9/1989 Slade ........................ 434/107
6,125,194 A * 9/2000 Yeh et al. ................... 382/132
6,751,354 B2 6/2004 Foote et al.

OTHER PUBLICATIONS

Girgensohn, A., Boreczky, J., Wilcox, L. Keyframe-based user interfaces for digital video, IEEE Computer, pp. 61-67,Sep. 2001.
Girgensohn, A., Foote, J. Video classification using transform coefficients. Proc. of the International Conference of Acoustics, Speech, and Signal Processing, vol. 6, pp. 3045-3048, Phoenix, Arizona, 1999.

* cited by examiner

*Primary Examiner*—Duy M Dang
(74) *Attorney, Agent, or Firm*—Fliesler Meyer LLP

(57) ABSTRACT

A system and method for detecting useful images and for ranking images in order of usefulness based on a vignette score describing how closely each one resembles a "vignette," or a central object or image surrounded by a featureless or deemphasized background. Several methods for determining an image's vignette score are disclosed as examples. Variance ratio analysis entails calculation of the ratio of variance between the edge region of the image and the entire image. Statistical model analysis entails developing a statistical classifier capable of determining a statistical model of each image class based on pre-entered training data. Spatial frequency analysis involves estimating the energy at different spatial frequencies in the central and edge regions and in the image as a whole. A vignette score is calculated as the ratio of mid-frequency energies in the edge region to the mid-frequency energies of the entire image.

26 Claims, 7 Drawing Sheets

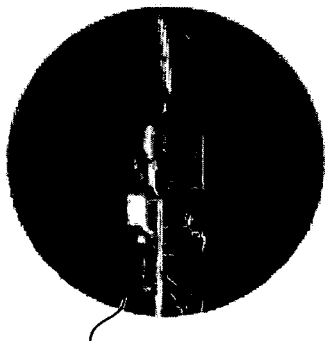
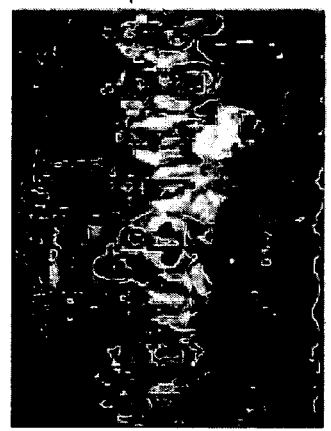
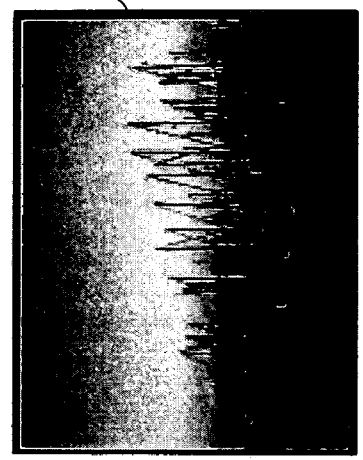
Beatles
Flower
Yacht
FIG._1

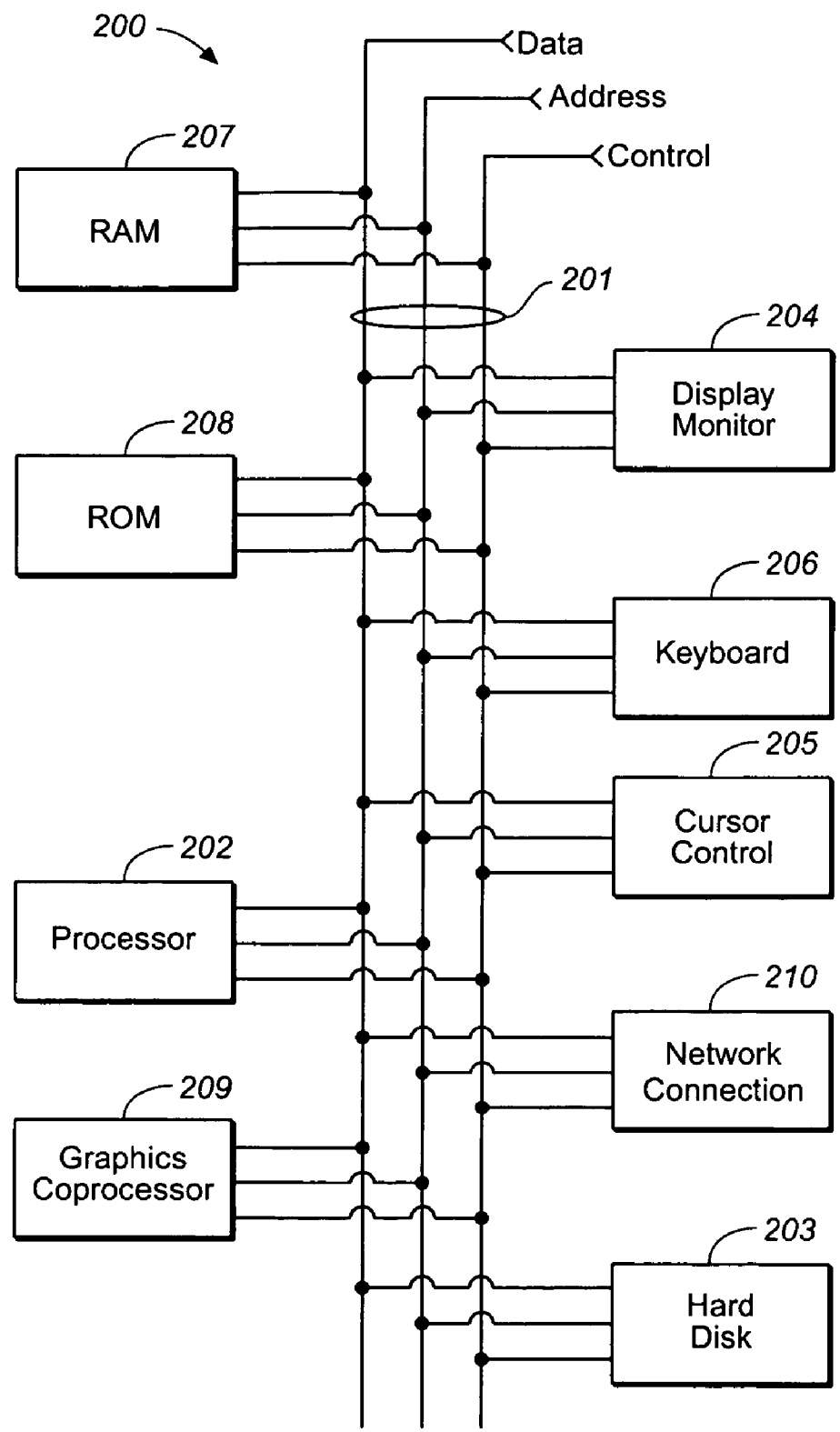
FIG._2

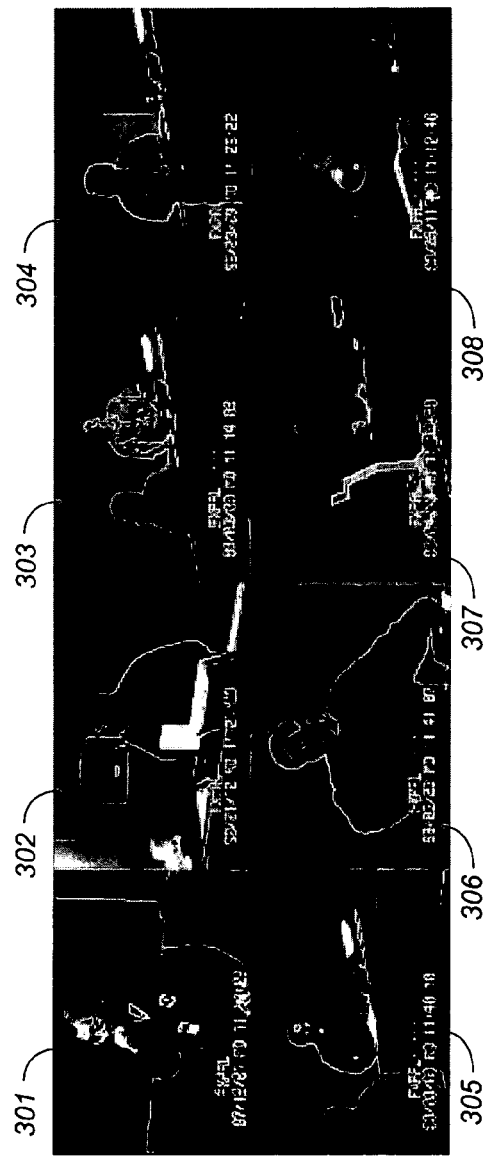
FIG._3

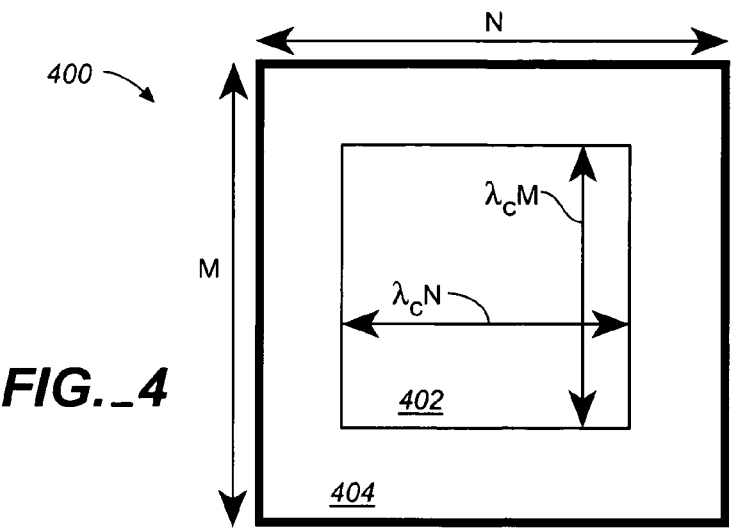
FIG._4
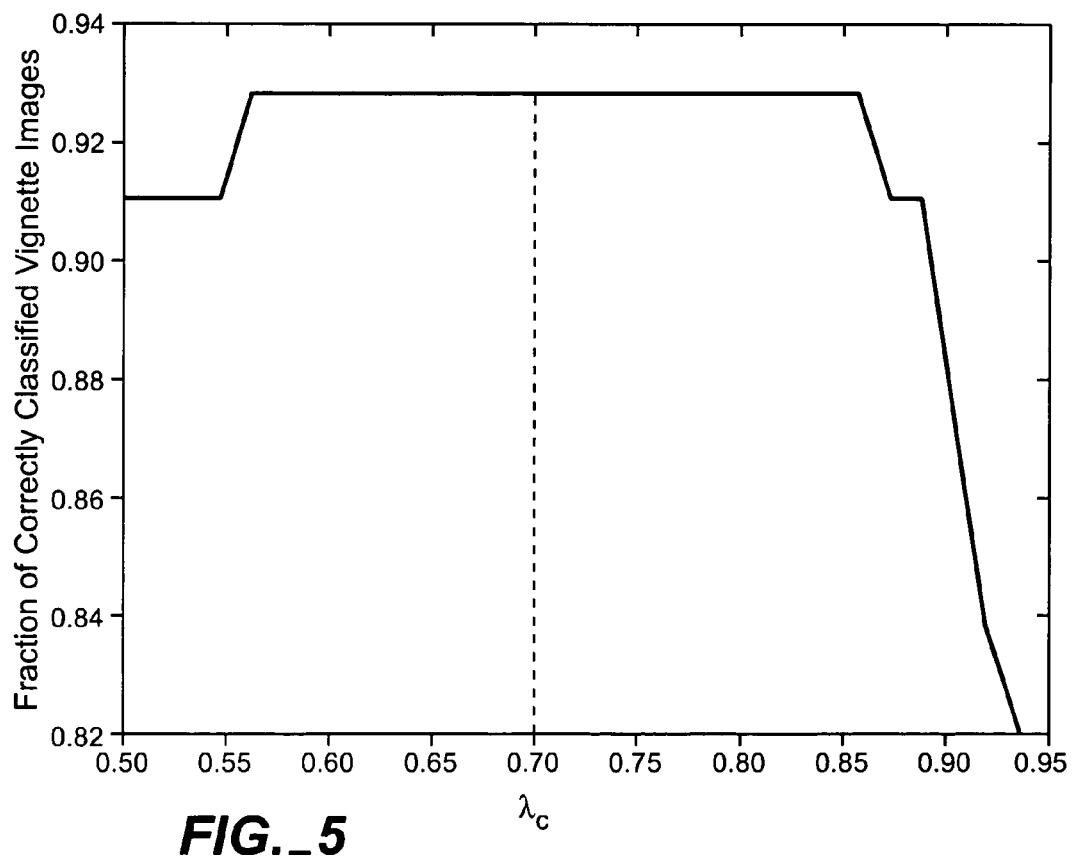
FIG._5

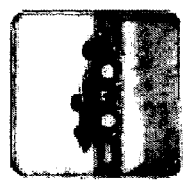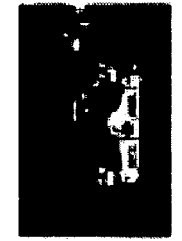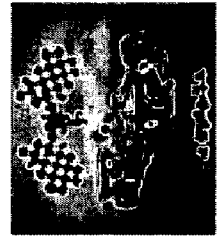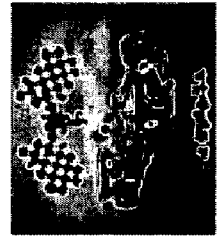
FIG._6

FIG._7
Bottom-ranked 12 of 80 images (from Google image search for race car)

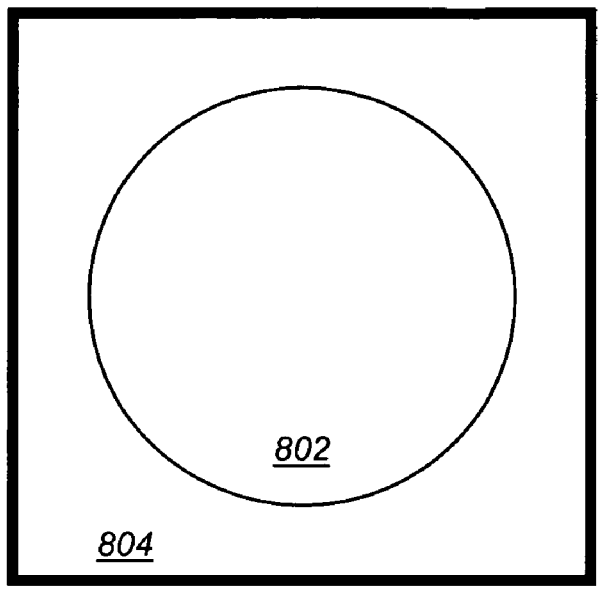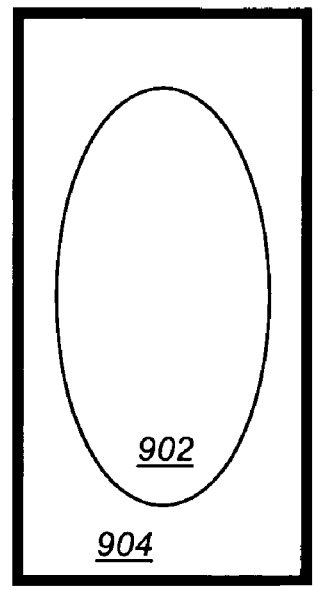
FIG._8    FIG._9

SYSTEM AND METHOD FOR DETECTING AND RANKING IMAGES IN ORDER OF USEFULNESS BASED ON VIGNETTE SCORE

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The invention is in the field of automatic media analysis and is related to systems and methods for organizing and ranking images, and particularly to a system and method for detecting useful images and for ranking images in order of usefulness based on how closely each one resembles a "vignette," or a central object or image surrounded by a featureless or deemphasized background. One application is computer interfaces or programs that act upon images, video or motion picture data.

BACKGROUND

Technology has developed very quickly regarding handling text obtained through Internet searches, document searches, etc. Text can be easily searched at the touch of a keystroke or the push of a button to find any desired text string. Text that is sorted in order of priority based on one search field can then be re-sorted according to a second search, and so on. The possibilities are virtually limitless.

Technology regarding sorting and ranking images has not progressed nearly as rapidly. This is partly understandable due to the basic differences between alpha-numeric based text strings and images and the greater ease with text-based computers of devising appropriate search strategies for text strings. Nevertheless, it may pose a significant obstacle to certain tasks. Primitive technologies have been developed to make it possible to use a search engine to locate images described by certain text strings. However, it is quite common that such a search may result in undesirable images. Undesirable images may be undesirable for a variety of reasons. They may have too many other distracting elements when it is desired to focus on one canonical item. Contrast between foreground and background may be too low, distracting the viewer. Such images may not be specific enough. They may be insufficiently informative.

Though there is substantial literature on computer vision, most work has focused either on detecting low-level features (edges, texture boundaries, etc.) or high-level semantics (faces, foreground/background, etc.).

It is desirable to develop a system and method for detecting useful images and for ranking images in order of usefulness.

SUMMARY

Generally, embodiments of the invention provide a system and method for detecting useful images and for ranking images in order of usefulness based on a vignette score. A vignette score describes how closely each image resembles a vignette image, or a central object or image centered on a blank or low-contrast background. "Vignetted" images are presumed more useful and more "iconic" than non-vignettes, at least in certain circumstances. Embodiments of the invention present methods for detecting this class of useful images, and for ranking each member in a group of images according to its vignette score, which estimates how useful it is based on how closely it resembles a vignette. Vignette scores can be scaled, normalized, and/or thresholded if desired. However, scaling, normalization and/or thresholding of vignette scores is not necessary because in any given application scores will typically be used primarily for ranking images according to their score relative to other vignettes. For a given method and a given set of images, the order of the vignette scores will not be changed by scaling, normalization, and/or thresholding.

Several methods for determining an image's vignette score are disclosed as examples. Three leading classes of methods are variance ratio analysis, statistical model analysis, and spatial frequency analysis.

Variance ratio analysis entails calculation of the ratio of variance between the edge region of the image and the entire image. The variance ratio can be used to rank images by their vignette score, such that an image with a high score is more likely to be a vignette. The vignette score can be computed by calculating a weighted ratio of variance of the image from more central regions to outlying regions, wherein the weighting is done based on the distance from the boundary. Two experiments are described below.

Statistical model analysis entails developing a statistical classifier capable of determining a statistical model of each image class based on pre-entered training data consisting of images defined as vignettes and images defined as non-vignettes. Given these statistical classifiers, which respectively act as models of a vignette V and a non-vignette NV, the likelihood that an unknown image was generated by each model can be determined, and the likelihood ratio then serves as another estimate of vignette score. Examples of statistical classifiers include Gaussian mixture models, linear classifiers, and Support Vector Machines (SVMs). These are discussed in more detail in the implementation section below.

Gaussian models are a useful means of classifying unknown data. In this method, a Gaussian model is determined for each class of to be identified, by computing the mean and covariance from a set of training data from that class. The probability that a class generated a given data point may be computed and the class model that generated an unknown data point with the highest likelihood is designated to be the class of the unknown data. A single-Gaussian model can be extended to a Gaussian mixture model by modeling each class likelihood as a weighted sum of several Gaussian functions, with means, covariances, and mixture weights determined by the well-known Expectation-Maximization (EM) algorithm. Gaussian mixture models are more appropriate for modeling data with multimodal distributions, i.e., having more than one peak. A Gaussian mixture model includes a single-Gaussian model as above with a single mixture weight of 1. Gaussian mixture models are a useful classification scheme that may be employed where one has two classes of data and wishes to determine into which class an item is likely to fall. The distribution of each class of data is modeled as a mixture of Gaussian distributions with appropriate means, covariances, and mixture weights.

Linear classifiers create decision hyper-planes capable of separating two sets of data having different class memberships. A decision hyper-plane is one that separates two sets of data having different class memberships. Most classification tasks, however, are not that simple, and often more complex structures are needed in order to make an optimal separation.

In more complicated cases, where linear classifiers are insufficiently powerful by themselves, Support Vector Machines are available. SVMs project data into a high-dimensional space where decision hyper-planes can then be used to easily determine on which side of the boundary an image lies. The SVM thereby makes it possible to separate a set of data into respective groups of interest (in this case, V and NV).

Yet another approach examines the energy at different spatial frequencies. By performing a discrete cosine transform (DCT) or similar linear discrete transform (as examples, a discrete Fourier transform or a Hadamard transform or a wavelet transform or another linear discrete transform), the energy in different spatial frequencies can be estimated in any particular region. In one embodiment, the energy in different spatial frequencies is estimated in the central region, in the edge region, and in the image as a whole. A vignette score is calculated as the ratio of mid-frequency energies in the edge region to the mid-frequencies of the entire image. This has the advantage that the variance due to low frequencies (for example, due to a soft-focus horizon line) and the variance due to high frequencies (from texture, quantization, or other noise processes) can be ignored, resulting in a more reliable vignette measure.

Mid-frequency energy can be efficiently computed from Joint Photographic Experts Group (JPEG)-encoded images, without having to fully reconstruct the image. JPEG images are encoded as macroblocks, or non-overlapping 8×8 or 16×16 regions. The major frequency components in each macroblock are determined using DCT analysis and then encoded. The macroblock period is the size of the macroblock. Energy in frequencies lower than the macroblock period is not explicitly coded. Averaging mid-frequency JPEG coefficients over macroblocks in an area yields an estimate of the mid-frequency energy in that area. This can easily be done for macroblocks in the central region and the image as a whole, and the ratio serves as a vignette score. For large image collections, this is much more efficient than fully reconstructing each image and calculating the variance ratio.

To implement spatial frequency analysis, all that is required is a few straightforward steps. The image is subdivided into edge and central regions, possibly by using square blocks. A linear discrete transform is performed on each block, using either a DCT or a discrete Fourier transform or a Hadamard transform or a wavelet transform or another linear discrete transform. The result is an array of transform coefficients, which are essentially the frequency coefficients for each block. As the next step, the energy in the middle frequency band is estimated for each block by summing the amplitude or squared amplitude (energy) of frequency coefficients in the middle bands. The resulting amplitudes are separately summed for the edge region and for the entire image, and normalized according to their relative areas. A vignette score can then be calculated based on the ratio of mid-frequency energy in the edge region to mid-frequency energy in the entire image. If the frequency components were obtained from JPEG-encoded macroblocks, this may be done without the need for transforming from the frequency domain back into the spatial domain.

BRIEF DESCRIPTION OF THE DRAWINGS

Preferred embodiments of the present invention will be described in detail based on the following figures, wherein:

FIG. 1 is a set of images that depicts some possible examples of vignette (V) and non-vignette (NV) images returned as a result of an image search;

FIG. 2 is a block diagram that illustrates a general purpose computer architecture suitable for performing the methods of the present invention;

FIG. 3 is a set of frames that illustrates training frames, inverse discrete cosine transforms of mean feature vectors derived from the training frames, and inverse Hadamard transforms of mean feature vectors derived from the training frames according to the present invention;

FIG. 4 is a diagram that illustrates the setup employed for the experiments in variance ratio analysis, depicting an embodiment utilizing a rectangular central region;

FIG. 5 is a graph of the fraction of correctly classified vignette images as a function of scaling ratio $\lambda_C$ for one of the experimental runs;

FIG. 6 is a set of images that shows the images in the first variance ratio analysis experiment that received the lowest variance ratios and thus the highest vignette scores;

FIG. 7 is a set of images that shows the images in the first variance ratio analysis experiment that received the highest variance ratios and thus the lowest vignette scores;

FIG. 8 is a diagram that depicts a variance ratio analysis embodiment utilizing a circular central region;

FIG. 9 is a diagram that depicts a embodiment utilizing an elliptical central region.

DETAILED DESCRIPTION

Generally, embodiments of the invention provide a system and method for detecting useful images and for ranking images in order of usefulness based on a vignette score. A vignette score describes how closely each image resembles a vignette image, or a center object or image centered on a blank or low-contrast background. This invention works on the assumption that "vignetted" images can in certain cases be more useful than images that do not have a vignette-like quality. For discussion, we will label the first class as "V" images and the second class as "NV" for Non-Vignette. Examples of V images include a person photographed against a featureless backdrop, a flower photographed against an out-of-focus background, and a wedding photo shaded to emphasize the couple in the center. Examples of NV images might include a crowded city sidewalk, the produce section in a supermarket, and a flock of guests at a wedding reception. If a user wished to obtain an iconic image of a person, flower, or married couple, it is quite likely that the images from the V category would be more appropriate and, at least, for certain uses, better. NV images, on the other hand, are generally harder to comprehend at a glance and may be excessively busy, uninformative, or insufficiently specific. FIG. 1 shows some possible examples of V images 100 and of NV images 110 returned as a result of different image search queries 120. Query 121 returned V image 101 and NV image 111. Query 122 returned V image 102 and NV image 112. Query 123 returned V image 103 and NV image 113. Clearly the V images are preferable.

Photographers or image editors will often photograph canonical items in such a way that they are vignetted, that is, emphasized by being central and against a low-contrast or otherwise plain background. Photographers use various techniques to do this, from drop cloths to hide a distracting object, to the common practice of using a limited depth of field to ensure that the image background is not in focus. Similarly, photographers or their editors can emphasize central objects in post-production using a variety of techniques. These include the classical practice of using a small window to selectively expose the center of a photographic print, to physically cropping away distracting edges of the image, to digital tools that simulate or go beyond these techniques.

Vignette images feature the central region and are more likely to contain canonical, exemplary and useful representations. Vignette images are thus good candidates to use as representative images from a collection or video, as they concisely depict a central object without the clutter of background, and they require less viewer effort to discern the depicted object. Methods are presented for detecting this class of useful images and for ranking each member in a group of images according to its vignette score (VS), which summarizes how useful it is based on how closely it resembles a vignette. We present automated methods to determine how much a given image is vignetted by classifying image features.

A vignette score can be increased for many images by applying a Gaussian blur to them, by filtering the outer regions with a low pass filter. Essentially the image is being blurred by replacing each pixel with an average of its neighbors weighted according to the neighbor's proximity with a Gaussian curve centered on the pixel. This process removes the high frequencies and softens the edges of an image.

Typical Usage:

FIG. 2 is a block diagram that illustrates a general purpose computer system 200 suitable for implementing the methods according to the present invention. The general purpose computer system 200 includes one or more processors 202. The cursor control device 205 is implemented as a mouse, a joy stick, a series of buttons, or any other input device which allows a user to control position of a cursor or pointer on the display monitor 204. The general purpose computer may also include random access memory 207, external storage 203, ROM memory 208, a keyboard 206, a network connection 210 and a graphics co-processor 209. The cursor control device 205 and/or the keyboard 206 are possible user interfaces for receiving user input according to the present invention. All of the elements of the general purpose computer 200 are optionally tied together by a common bus 201 for transporting data between the various elements. The bus 201 typically includes data, address, and control signals. Although the general purpose computer 200 illustrated in FIG. 2 includes a single data bus 201 which ties together all of the elements of the general purpose computer 200, there is no requirement that there be a single communication bus 201 which connects the various elements of the general purpose computer 200. For example, the one or more processors 202, RAM 207, ROM 208, and graphics co-processor 209 are alternatively tied together with a data bus while the hard disk 203, network connection 210, keyboard 206, display monitor 204, and cursor control device 205 are connected together with a second data bus (not shown). In this case, the first data bus 201 and the second data bus (not shown) are linked by a bi-directional bus interface (not shown). Alternatively, some of the elements, such as the one or more processors 202 and graphics co-processor 209, are connected to both the first data bus 201 and the second data bus (not shown), and communication between the first and second data bus occurs through the one or more processors 202 and graphics co-processor 209. The methods of the present invention are thus executable on any general purpose computer system such as the 200 illustrated in FIG. 2, but there is clearly no limitation that this computer system is the only one which can execute the methods of the present invention.

In many cases, a number of images are represented or characterized by a single or reduced number of images that are selected using the invention. For example, in one embodiment, a folder or directory containing a large number of images can be represented by an icon comprising an image or images selected using the invention as most representative of the collection. In another embodiment, the image sequence in a video clip can be represented by one or more frame determined by the invention as most representative of the images in the video segment. For example, in the file view interface of many operating systems, the first frame in a video file is used to represent that data.

In a further embodiment, a search engine may return a large number of images in response to a query. Some of these images will be more satisfactory to a user's information needs while others will be less pertinent. This embodiment provides a method for detecting and ranking the most useful images. In another embodiment applied to collections of stock images, typically the user must rapidly skim a large number of available images. This embodiment provides a method for detecting and ranking the images likely to be most applicable to the desired use. The user's information needs are satisfied by the invention's capability of detecting and ranking vignette images.

Several methods for determining an image's vignette score are disclosed as examples. While many other approaches are possible, three leading classes of methods are variance ratio analysis, statistical model analysis (including, as two sub-classes of embodiments, Gaussian mixture models and Support Vector Machines), and spatial frequency analysis. Spatial frequency analysis includes, as five sub-classes of embodiments, a DCT, a discrete Fourier transform, a Hadamard transform, a wavelet transform (all of these being examples of linear discrete transforms), and in the case where the image is encoded in the JPEG format, direct application of JPEG coefficients.

Variance Ratio Analysis:

Variance ratio analysis entails calculation of the ratio of variance between the edge region of the image and the entire image. Vignette images will have a small variance of pixels nearest the edge, while NV images will have edge variances that do not differ as significantly from the variances in the center region. The variance ratio can be used to rank images by their vignette score, such that an image with a high score is more likely to be a vignette, and thus is preferable, at least for certain applications. In one embodiment, the vignette score is computed by calculating a weighted ratio of variance of the image from more central regions to outlying regions, wherein the weighting is done based on the distance from the boundary. An experiment using variance ratio analysis in which an embodiment of the invention was implemented is described below.

Statistical Model Analysis:

Statistical model analysis entails developing a statistical classifier capable of determining a statistical model of each image class based on pre-entered training data consisting of images defined as vignettes and images defined as non-vignettes. Given these statistical classifiers, which respectively act as models of a vignette V and a non-vignette NV, the likelihood that an unknown image was generated by each model can be determined, and the likelihood ratio then serves as another estimate of vignette score. Examples of statistical classifiers include Gaussian mixture models, linear classifiers, and Support Vector Machines (SVMs). These are discussed in more detail in the implementation section below.

Given an unknown image i, a calculation is performed of the ratio $P(Vi)/P(NVi)$. This ratio will be relatively large for an image resembling a vignette and relatively small for an image not as closely resembling a vignette. Therefore this ratio can directly serve as a vignette score. Depending on the exact embodiment, this ratio may directly represent the vignette score VS or may be scaled and normalized so as to be transformed into VS if desired. However, scaling and/or normalization of vignette scores is not always necessary because in a typical application scores will typically be used primarily for ranking images according to their score relative to other images. For a given method and a given set of images, the order of the vignette scores will not be changed by scaling and/or normalization.

Gaussian models are a useful means of classifying unknown data. In this method, a Gaussian model is determined for each class of to be identified, by computing the mean and covariance from a set of training data from that class. The probability that a class generated a given data point may be computed and the class model that generated an unknown data point with the highest likelihood is designated to be the class of the unknown data. A single-Gaussian model can be extended to a Gaussian mixture model by modeling each class likelihood as a weighted sum of several Gaussian functions, with means, covariances, and mixture weights determined by the well-known Expectation-Maximization (EM) algorithm. Gaussian mixture models are more appropriate for modeling data with multimodal distributions, i.e., having more than one peak. A Gaussian mixture model includes a single-Gaussian model as above with a single mixture weight of 1. Gaussian mixture models are a useful classification scheme that may be employed where one has two classes of data and wishes to determine into which class an item is likely to fall. The distribution of each class of data is modeled as a mixture of Gaussian distributions with appropriate means, covariances, and mixture weights.

Linear classifiers create decision hyper-planes capable of separating two sets of data having different class memberships. A decision hyper-plane is one that separates two sets of data having different class memberships. Most classification tasks, however, are not that simple, and often more complex structures are needed in order to make an optimal separation.

In more complicated cases, where linear classifiers are insufficiently powerful by themselves, Support Vector Machines are available. SVMs project data into a high-dimensional space where decision hyper-planes can then be used to easily determine on which side of the boundary an image lies. The SVM thereby makes it possible to separate a set of data into respective groups of interest (in this case, V and NV).

SVMs use a set of mathematical functions, known as kernels, to map a set of original data. The mapped data are linearly separable and, thus, instead of constructing a complex curve, all we have to do, once the SVM projection process is completed, is to find a hyper-plane that can separate the V data and the NV data.

Spatial Frequency Analysis:

The above-described statistical classifiers require low-dimensional features that represent the images. Dimensional reduction is commonly accomplished in the frequency domain, by estimating the energy at different spatial frequencies. Different possible embodiments of spatial frequency analysis entail different techniques for estimating energy at different spatial frequencies. One embodiment calls for performing a DCT. In another embodiment, a discrete Fourier transform is performed. A third embodiment entails performing a Hadamard transform. A fourth embodiment entails performing a wavelet transform.

This approach breaks down an image into a sum of two-dimensional sinusoids, after which the dimensions of the feature space are reduced through the discarding of the low magnitude components. An entire class of images can be crudely represented with only ten parameters even though the number of pixels is twenty orders of magnitude greater. FIG. 3 is a set of frames that illustrates training frames, inverse discrete cosine transforms of mean feature vectors derived from the training frames, and inverse Hadamard transforms of mean feature vectors derived from the training frames according to the present invention. Thus, training frames 301 through 308 represent a series of training images pertaining to a video image class. The image class represented by training images 301 through 308 are described in English terms as "speaker standing in front of podium." Frame 310 illustrates the inverse discrete cosine transform corresponding to the mean feature vector computed from a plurality of feature vectors extracted from training frames of which training frames 301 through 308 are an example. In frame 310, the feature set for video classification is a ten-entry feature set. Thus, only ten transform coefficients from each frame make up the feature vector associated with each training frame. Frame 311 represents the inverse discrete cosine transform of the mean feature vector computed from a 100-entry feature vector extracted from each of the training frames 301 through 308. Frame 312 is the inverse discrete cosine transform of a 1000-entry mean feature vector. Frame 312 shows more detail than frame 311, which itself shows more detail than frame 310, because of the increased number of coefficients used in the inverse discrete cosine transform.

Frame 320 represents the inverse Hadamard transform of the mean feature vector derived from the training images. Frame 321 represents the inverse Hadamard transform corresponding to a 1000-entry mean feature vector. Frame 322 represents the inverse Hadamard transform corresponding to a 1000-entry mean feature vector.

MPEG frames taken at ½-second intervals were decoded and reduced to 64×64 grayscale intensity sub-images. The resulting frame images were discrete cosine transform and Hadamard transform coded. Both the coefficients with the highest variance (rank) and the most important principal components were selected as features. Gaussian mixture models were trained on the training set using a variable number of dimensions between 1 and 1000. FIG. 3 shows samples for one of the feature categories. That category consists of close-ups of people against a lighter (white) background. Note how the images for this class are highly variable in camera angle, lighting, and position, perhaps more than images of a typical news anchor. The mean and covariance were trained using the highest-variance discrete cosine transform and Hadamard transform coefficients. Each model has been imaged by inverse-transforming the mean with the discarded coefficients set to zero. Though the co-variance is not shown, it is clear the mean captures the major feature—the dark central figure—from the training data. FIG. 3 shows that even with a small number of coefficients, the major shapes in the training data are still recognizable when inversely transformed. These techniques exploit the high degree of correlation between neighboring pixels.

System Implementation:

In a typical implementation, the operator uses a computer system that includes a computer display, and some form of graphical interface executing thereon, for example, a Unix Windows environment, a Mac OS, or a Microsoft Windows environment, or some other graphical application environment. It will be evident to one skilled in the art that embodiments of the invention can be equally used with other forms of graphical user interface (GUI).

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Embodiments of the present invention include software, stored on any one of the computer readable medium (media), for controlling both the hardware of the general purpose/specialized computer or microprocessor, and for enabling the computer or microprocessor to interact with a human operator or other mechanism utilizing the results of the present invention. Such software may include, but is not limited to, device drivers, operating systems, and user applications. Ultimately, such computer readable media further includes software for executing the present invention, as described above.

Stored on any one of the computer readable medium (media), embodiments of the present invention include software for controlling both the hardware of the general purpose/specialized computer or processor, and for enabling the computer or processor to interact with a human user or other mechanism utilizing the results of embodiments of the present invention. Such software may include, but is not limited to, device drivers, operating systems, and user applications. Ultimately, such computer readable media further includes software for performing embodiments of the present invention, as described above.

Included in the software of the general/specialized computer or processor are software modules for implementing the teachings of the present invention, including, but not limited to, detecting useful images, ranking images in order of usefulness based on how closely each one resembles a "vignette," and communication of results according to the processes of embodiments of the present invention.

Embodiments of the present invention may be conveniently implemented using a conventional general purpose or a specialized digital computer or processor programmed according to the teachings of the present disclosure, as will be apparent to those skilled in the computer art.

In one embodiment, the invention is applied to a media organizer. A media organizer provides a means to organize digital photos, often through a lightbox-like interface offering the capable to view images, to rearrange them in any desired configuration, to print any or all images as desired, to delete duplicates and unwanted images, and to upload or download any or all images as desired. Embodiments of the invention offer the capability to rank the images with numerical ranks in order of usefulness based on their vignette scores, which complements the media organizer's other capabilities.

In one embodiment, the invention is applied to a video database. A video database is the rough equivalent of a media organizer for digital video content. By utilizing frames, a video database provides a means to organize video content as described by frames, often through a lightbox-like interface offering the capable to view frames, to rearrange them in any desired configuration, to print any or all frames as desired, to delete duplicates and unwanted videos, and to upload or download any or all videos and/or any or all frames as desired. Embodiments of the invention offer the capability to rank the frames and, therefore, the videos that they represent with numerical ranks in order of usefulness based on their vignette scores, which complements the video database's other capabilities.

In another embodiment related to digital video, the invention offers the capability to use vignette scores for various frames to select the frame that best represents a given video segment.

In one embodiment, the invention is applied to a set of images obtained in an Internet search.

Implementation of Variance Ratio Analysis:

Two separate runs of an experiment was performed to implement and to test the effectiveness of the variance ratio method and to explore the parameter space. One particular design choice that had to be addressed was a definition of the portion of the image defined as the central region. FIG. 4 is a diagram that illustrates the setup employed for the experiment in variance ratio analysis. FIG. 4 depicts an image 400 of length N and width M. As shown in FIG. 4, the experiment used a rectangular central region 402 whose length $\lambda_C N$ and width $\lambda_C M$ are each defined as the same specific fractional scaling ratio $\lambda_C$, $0 \leq \lambda_C \leq 1$ of, respectively, the length N and width M of the image 400. In this implementation, the fraction $\lambda_C$ is the same in both width and height, and is expressed as a fraction of the normalized image dimension. Thus, for an N×M pixel image, the central region 402 is a rectangle of dimension $\lambda_C N \times \lambda_C M$ pixels, centered in the image. The central region 402 thus has the same aspect ratio as the original image, though without loss of generality $\lambda_C$ could be defined to be different in the width, height or any other direction. The edge region 404 is defined as all those pixels not in the central region.

For the experiment, a set of 59 vignette images and 57 non-vignette images were obtained from the Google image search engine using a variety of keywords. Three examples of the V images and three examples of the NV images are depicted in FIG. 1. These images were ranked using the variance ratio method in the particular embodiment described above. A value for $\lambda_C$ was selected after some preliminary tests of variance ratio were performed to determine the value of $\lambda_C$ that best discriminates between V and NV test images. Images were categorized as looking like vignettes or non-vignettes. Then vignette scores were calculated for each of a small set of images and each of several values of $\lambda_C$, which was allowed to vary between the values of 0.5 and 1. Varying $\lambda_C$ led, predictably enough, to variance in the percentage of correct vignette score classifications received for each different value of $\lambda_C$. If $\lambda_C$ is too small, effectively most of the image would be edge, while if $\lambda_C$ is too large, effectively most of the image would be center. FIG. 5 presents a graph of the fraction of correctly classified vignette images as a function of $\lambda_C$ for one of the experimental runs. As can be seen from the figure, an approximate value of $\lambda_C=0.7$ is likely to result in the most accurate vignette scores.

A low variance ratio corresponds to a higher vignette score, as the most vignette-like images will have a low background variance. Similarly, a high variance ratio will result in a low vignette score. FIG. 6 is a set of images that shows the twelve top-ranked images, with their numerical VS scores and ranks in VS score from 1 to 12. FIG. 7 is a set of images that shows the twelve bottom-ranked images, with their numerical VS scores and ranks in VS score from 81 to 70. Clearly the top-ranked images are, in general, more vignette-like and would be preferable in a search application. The bottom-ranked images are generally more busy and have a less obvious central focus.

However, one interesting and instructive exception does exist from the first experiment. Image 81, the image with the poorest vignette score, could actually be considered a vignette. The reason why this image achieved a score suggesting it is a non-vignette arises from the high variance of its stark black-on-white border. The border effectively "tricked" this particular calculation method into reaching a misleading score. This problem could be avoided by use of one or more of the spatial frequency methods described above, or by use of the statistical model, assuming prior training has been performed using a sufficient number of images.

The experimental choice of a rectangular $R_C$ is arbitrary. Many other shapes are also possible. FIG. 8 is a diagram that depicts an embodiment utilizing a circular central region 802 and with a surrounding edge region 804. FIG. 9 is a diagram that depicts an embodiment utilizing an elliptical central region 902 and with a surrounding edge region $R_e$ 904. Also there is no reason to require a hard boundary between the two regions. The classification of membership in the edge or center may instead be, for example, weighted by distance from the boundary.

Implementation of Statistical Model Analysis:

Examples of statistical classifiers include Gaussian mixture models, linear classifiers, and Support Vector Machines (SVMs). Gaussian mixture models are a useful classification scheme that may be employed where one has two classes of data and wishes to determine into which class an item is likely to fall. The distribution of each class of data is modeled as a mixture of Gaussian distributions with appropriate mean, covariances, and mixture weights.

Any item belonging to a set of Gaussian-distributed data is more likely to belong to the class whose Gaussian distribution has a larger value at that point. A typical example involves two single-dimensional Gaussian distributions having different means and variances. Distribution A has mean $\mu_A$ and Distribution B has mean $\mu_B$. The probability of a particular value being produced from distribution A or from distribution B is the vertical position of the distribution relative to the axis at that point. The point is most likely to have come from the distribution having the higher vertical position relative to the axis at the given point.

Given feature data, video segments are modeled statistically. A simple statistical model is a multi-dimensional Gaussian distribution. Letting vector x represent the features for one frame, the probability that the frame was generated by a single Gaussian model c is $$P(x) = ((2\pi)^{-d/2} |\Sigma_c|^{-1/2}) \exp(-\tfrac{1}{2}(x-\mu_c)' \Sigma_c^{-1}(x-\mu_c)),$$

where $\mu_c$, is the mean feature vector, and $\Sigma_c$ is the covariance matrix of the d-dimensional features associated with model c. The expression $(x-\mu_c)'$ is the transform of the difference vector. In practice, it is common to assume a diagonal covariance matrix, i.e. the off-diagonal elements of $\mu_c$ are zero. This has several advantages. Most importantly, it reduces the number of free parameters (matrix elements) from $d(d-1)/2$ to d, which is important given the high dimensionality d of the problem ("d" is on the order of 100). This also means that the inverse of the matrix is much simpler to compute and is more robust, because the co-variance matrix is often ill-conditioned when computed from a small number of training samples. Thus, to classify an image using Gaussian mixture models, a set of example training images for each desired class is assembled, and the parameter vectors $\mu_c$ and $\Sigma_c$ are computed. Given an unknown image x, each image class probability is computed, and the image classified by the maximum-likelihood model. The log-likelihood alone is a useful measure of similarity to a particular class (the training set) and is used directly in applications such as the video browsers according to embodiments of the present invention. More sophisticated models can use Gaussian mixtures, given the expectation-maximization algorithm to estimate the multiple parameters and mixture weights. As further alternatives, neural network or other types of classifiers are employed. A Gaussian mixture model includes a single-Gaussian model with a single mixture weight of 1. For single Gaussians, computing $\mu_c$ and $\Sigma_c$, is computationally straightforward and is done rapidly on the fly. In the case of a training model from a single image, the mean vector is set to the image features and the variance vector (diagonal covariance matrix) set to some ratio of the global variance across all images. Given an unknown frame and several models, the unknown frame is classified by which model produces it with the maximum probability.

In the present case of vignettes and non-vignettes, features are extracted from V and NV test images. Models are constructed for the images that are vignettes and other models are constructed for the images that are non-vignettes. If features are well chosen, the two Gaussian distributions should have peaks at substantially different locations.

As discussed above, where possible, linear classifiers may be used to create decision hyper-planes capable of separating two sets of data having different class memberships. Unfortunately, most classification tasks require more complex structures are needed in order to make an optimal separation.

The more typical situation requires a more complex structure such as a Support Vector Machine to make an optimal separation of the V and NV data. Often a full separation of the V and NV data requires a curve (which is more complex than a line). SVMs are particularly suited to handle such tasks.

Support Vector Machines (SVMs) project data into a high-dimensional space where decision hyper-planes can be used to easily determine on which side of the boundary an image lies. In this case, the boundary demarcates V and NV territory. If data belong either to class V or NV, then a separating line defines a boundary on one side of which all data are V and on the other side of which all data are NV. Any new object is labeled, i.e., classified, as V or as NV according to which side of the boundary it falls upon.

In a typical application of SVMs, the input space comprises a number of original data. Original data in the current application include original V data and original NV data. A complex curve is created to separate the original V data and the original NV data. Each original object is individually mapped, i.e., rearranged, using a set of mathematical functions, known as kernels, and producing the set of mapped data. The process of rearranging the data is known as mapping or transformation. The mapped data are linearly separable and, thus, instead of constructing a complex curve, all that must be done is to find an optimal line that can separate the V data and the NV data. The SVM performs classification tasks by constructing hyper-planes in a multi-dimensional space that separates cases of different class labels, in this case, V and NV.

Implementation of Spatial Frequency Analysis:

To implement spatial frequency analysis, all that is required is a few straightforward steps possibly by using square blocks. A linear discrete transform is performed on each block, using either a DCT or a discrete Fourier transform or a Hadamard transform or a wavelet transform or another linear discrete transform. The result is an array of transform coefficients, which are essentially the frequency coefficients for each block. The result is, according to these examples, an array of transform coefficients, which are essentially the frequency coefficients for each block.

As the next step, the energy in the middle frequency band is estimated for each block by summing the amplitude or squared amplitude (energy) of frequency coefficients in the middle bands. The resulting amplitudes are separately summed for the edge region and for the entire image, and normalized according to their relative areas. A vignette score can then be calculated based on the ratio of mid-frequency energy in the edge region to mid-frequency energy in the entire image. If the frequency components were obtained from JPEG-encoded macroblocks, this may be done without the need for transforming from the frequency domain back into the spatial domain.

Conclusion Regarding Implementation:

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described features of detecting and ranking images with numerical ranks in order of usefulness based on vignette score can be incorporated into other types of software applications beyond those described. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for detecting useful images and for ranking images in order of usefulness, comprising the step of:
    a) computing a vignette score for each image in a given set of images, wherein a vignette score describes how closely an image resembles a central object surrounded by a featureless or deemphasized background; and
    b) ranking the images with numerical ranks according to each image's vignette score.

2. The method of claim 1, wherein the step of computing a vignette score utilizes variance ratio analysis.

3. The method of claim 1, wherein the step of computing a vignette score for each image in a given set of images comprises computing a vignette score for each still image in a given set of still images.

4. The method of claim 1, wherein the step of computing a vignette score for each image in a given set of images comprises computing a vignette score for each video frame in a given set of video frames.

5. The method of claim 4, wherein the method is applied to video frames comprised in a video database.

6. The method of claim 1, wherein the step of computing a vignette score for each image in a given set of images comprises computing a vignette score for each motion picture frame in a given set of motion picture frames.

7. The method of claim 1, comprising the further step of:
    c) selecting one or more images as one or more most representative images based on each image's numerical rank.

8. The method of claim 7, wherein the step of computing a vignette score for each image in a given set of images comprises computing a vignette score for each video frame in a given set of video frames.

9. The method of claim 7, wherein the step of computing a vignette score for each image in a given set of images comprises computing a vignette score for each motion picture frame in a given set of motion picture frames.

10. The method of claim 1, wherein the step of computing a vignette score for each image in a given set of images comprises computing a vignette score for each image obtained in an Internet search in a given set of images, wherein each image in the set of images is one of a) obtained in an Internet search; and b) selected from a collection of stock images.

11. The method of claim 1, wherein the method is applied to images comprised in one of a media organizer and a video database.

12. The method of claim 1, wherein the vignette score for each image is computed by determining the ratio of variance between the edge region of the image and the entire image.

13. The method of claim 1, wherein the vignette score for each image is computed by calculating a weighted ratio of variance of the image from more central regions to outlying regions, wherein the weighting is done based on the distance from the boundary.

14. The method of claim 1, wherein the vignette score for each image is computed by using a statistical classifier capable of determining a statistical model of each image class based on pre-entered training data consisting of images defined as vignettes and images defined as non-vignettes.

15. The method of claim 14, wherein the statistical classifier is a Gaussian mixture model.

16. The method of claim 14, wherein the statistical classifier is a Support Vector Machine.

17. The method of claim 1, wherein the vignette score for each image is computed by performing a spatial frequency analysis and calculating the ratio of mid-frequency energies in an edge region to the mid-frequencies of the entire image.

18. The method of claim 17, wherein the spatial frequency analysis consists of direct computation using Joint Photographic Experts Group (JPEG) coefficients.

19. The method of claim 17, wherein the spatial frequency analysis performed is a linear discrete transform.

20. The method of claim 19, wherein the linear discrete transform is one of a discrete cosine transform (DCT), a discrete Fourier transform, a Hadamard transform, and a wavelet transform.

21. A method for detecting useful images and for ranking images in order of usefulness, comprising the steps of:
    a) computing a vignette score for each image in a given set of images, wherein a vignette score describes how closely an image resembles a central object surrounded by a featureless or deemphasized background;
    b) ranking the images with numerical ranks according to each image's vignette score; and
    c) selecting one or more images as one or more most representative images based on each image's numerical rank.

22. The method of claim 21, comprising the further step of:
    d) creating an icon comprising the one or more most representative images.

23. A system for detecting useful images and for ranking images in order of usefulness, comprising;
    a) one or more processors capable of computing a vignette score for each image in a given set of images, wherein the vignette score describes how closely an image resembles a central object surrounded by a featureless or deemphasized background and is determined using a method selected from the group consisting of variance ratio analysis, Guassian mixture model analysis, linear classifiers, support vector machines, discrete cosine transform, discrete fourier transform, Hadamard transform and wavelet transform, the one or more processors being further capable of ranking the images numerically according to each image's vignette score; and b) a machine readable medium including operations stored thereon that when processed by the one or more processors cause a system to perform the steps of computing the vignette score for each image in the given set of images and ranking the images numerically according to each image's vignette score.

24. A method for detecting useful images and for ranking images in order of usefulness, comprising the steps of:
c) allowing a user to select a set of one or more images to be ranked;
d) computing a vignette score for each image in the set of images, wherein a vignette score describes how closely an image resembles a central object surrounded by a featureless or deemphasized background; and
e) ranking the images with numerical ranks according to each image's vignette score.

25. A machine readable medium including operations stored thereon that when processed by one or more processors cause a system to perform the steps of:
a) computing a vignette score for each image in a given set of images, wherein a vignette score describes how closely an image resembles a central object surrounded by a featureless or deemphasized background; and
b) ranking the images with numerical ranks according to each image's vignette score.

26. A system apparatus for detecting useful images for ranking images in order of usefulness, comprising:
means for computing a vignette score for each image in a given set of images, wherein a vignette score describes how closely an image resembles a central object surrounded by a featureless or deemphasized background; and
means for ranking the images numerically according to each image's vignette score.

* * * * *